(12) United States Patent
Hiramatsu (10) Patent No.: US 10,899,203 B2
(45) Date of Patent: Jan. 26, 2021

(54) SUNROOF APPARATUS (71) Applicant: AISIN SEIKI KABUSHIKI KAISHA, Kariya (JP)

(72) Inventor: Shinichi Hiramatsu, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 139 days.

(21) Appl. No.: 16/369,478

(22) Filed: Mar. 29, 2019

(65) Prior Publication Data
US 2019/0299762 A1 Oct. 3, 2019

(30) Foreign Application Priority Data

Mar. 30, 2018 (JP) .................................. 2018-066361

(51) Int. Cl.
*B60J 7/043* (2006.01)
*B60J 7/057* (2006.01)
*E05F 15/655* (2015.01)

(52) U.S. Cl.
CPC ........... *B60J 7/0435* (2013.01); *B60J 7/0573* (2013.01); *E05F 15/655* (2015.01); *E05Y 2900/542* (2013.01)

(58) Field of Classification Search
CPC ... B60J 7/02; B60J 7/043; B60J 7/0435; B60J 7/0575
USPC ..... 296/216.01, 216.02, 216.03, 216.04, 222
See application file for complete search history.

(56) References Cited

U.S. PATENT DOCUMENTS

| 8,182,029 B2 * | 5/2012 | Van Boxtel | B60J 7/024 |
| | | | 296/216.03 |
| 8,567,859 B2 | 10/2013 | Grimm et al. | |
| 8,807,646 B2 | 8/2014 | Grimm et al. | |
| 9,216,631 B2 * | 12/2015 | Heidan | B60J 7/024 |
| 2007/0013210 A1 * | 1/2007 | Sawada | B60J 7/024 |
| | | | 296/216.01 |
| 2007/0085385 A1 * | 4/2007 | Sawada | B60J 7/04 |
| | | | 296/216.01 |
| 2016/0200183 A1 * | 7/2016 | Holzel | B60J 7/0435 |
| | | | 296/216.05 |

FOREIGN PATENT DOCUMENTS

| DE | 10 2011 013 826 | 9/2012 |
| DE | 10 2011 018 151 | 10/2012 |

\* cited by examiner

*Primary Examiner* — Jason S Daniels
(74) *Attorney, Agent, or Firm* — Finnegan, Henderson, Farabow, Garrett & Dunner, LLP (57) ABSTRACT

A sunroof apparatus includes a link including a first guide surface configured to slide with a first guide shaft in a case where a shoe moves in a first direction and a second guide surface configured to slide with a second guide shaft, the link rotating between a standing position and an inclination position in a state of supporting a movable panel, the standing position where the movable panel is arranged at a tilt-up position, a inclination position where the movable panel is arranged at a tilt-down position. In a case where the link is arranged between a first position and a middle position, a first distance is longer than a second distance. In a case where the link is arranged between a second position and the middle position, the second distance is longer than the first distance.

8 Claims, 10 Drawing Sheets

FIG. 10B

SUNROOF APPARATUS

CROSS REFERENCE TO RELATED APPLICATIONS

This application is based on and claims priority under 35 U.S.C. § 119 to Japanese Patent Application 2018-066361, filed on Mar. 30, 2018, the entire content of which is incorporated herein by reference.

TECHNICAL FIELD

This disclosure generally relates to a sunroof apparatus.

BACKGROUND DISCUSSION

A known sunroof apparatus includes a movable panel, guide rails, shoes, and links as disclosed in DE102011013826A (hereinafter referred to as Patent reference 1). The movable panel covers a roof opening portion. The guide rails extend in a vehicle front-rear direction at both end portions of the roof opening portion in a width direction. The shoes move along the guide rails. The links support rear end portions of the movable panel.

According to the sunroof apparatus disclosed in Patent reference 1, in a case where the shoes move in a vehicle rear direction, the links rotate to be stood up by the shoes that press guide surfaces formed at the links. Thus, the rear end portion of the movable panel moves upward relative to a front end portion thereof, and the movable panel is tilted up. On the contrary, in a case of moving in a vehicle front direction, the shoes push the other guide surfaces provided at the links, and thus the links rotate so as to be inclined forward. Accordingly, the rear end portion of the movable panel moves downward relative to the front end portion thereof and the movable panel is tilted down. A first guide surface and a second guide surface of the link each corresponds to an inner surface of a guide hole formed so as to extend toward a distal end portion supporting the movable panel from a base end portion through which a rotation center of the link passes.

According to the sunroof apparatus disclosed in Patent reference 1, the link rotates by the movement of the shoe in the vehicle front-rear direction because torque about the rotation center is applied to the link. Here, the torque is in proportion to a distance from the rotation center of the link to a contact point between a guide shaft and a guide surface. Thus, according to the sunroof apparatus of the aforementioned configuration, the torque applied to the link is easily decreased because the distance is decreased as the link is stood up. In other words, according to the sunroof apparatus of the aforementioned configuration, the movable panel may be unstably tilted in response to the increase of the rotation amount of the link.

This issue may occur not only in a case where the link rotates so as to be stood up but also a case where the link rotates so as to be inclined.

A need thus exists for a sunroof apparatus which is not susceptible to the drawback mentioned above.

SUMMARY

According to an aspect of this disclosure, a sunroof apparatus includes a movable panel opening and closing a roof opening portion by moving between a tilt-down position and a tilt-up position where a rear end portion of the movable panel rises relative to a front end portion thereof higher than the tilt-down position, a guide rail arranged at each end portion of the roof opening portion in a vehicle width direction, the guide rail extending in a vehicle front-rear direction, a shoe including a first guide shaft and a second guide shaft extending in the vehicle width direction, the shoe moving along with the guide rail, and a link including a first guide surface and a second guide surface, the first guide surface configured to slide with the first guide shaft in a case where the shoe moves in a first direction, the second guide surface configured to slide with the second guide shaft, the link rotating between a standing position and an inclination position in a state of supporting the movable panel, the standing position where the movable panel is arranged at the tilt-up position, the inclination position where the movable panel is arranged at the tilt-down position. In a case where a first position is one of the inclination position and the standing position, a second position is the other of the inclination position and the standing position, a middle position is between the first position and the second position, a first distance is from a rotation center of the link to the first guide shaft, and a second distance is from the rotation center of the link to the second guide shaft, the link rotates from the first position to the middle position by sliding of the first guide shaft with the first guide surface, and rotates from the middle position to the second position by sliding of the second guide shaft with the second guide surface. In a case where the link is arranged between the first position and the middle position, the first distance is longer than the second distance. In a case where the link is arranged between the second position and the middle position, the second distance is longer than the first distance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A sunroof apparatus and a vehicle including the sunroof apparatus according to an embodiment will hereunder be explained with reference to the drawings. Expressions, for example, a vehicle width direction, a vehicle front-rear direction, and a vehicle upper-lower direction are employed for the explanation in a state where the sunroof apparatus is mounted on a vehicle.

Figure 1:
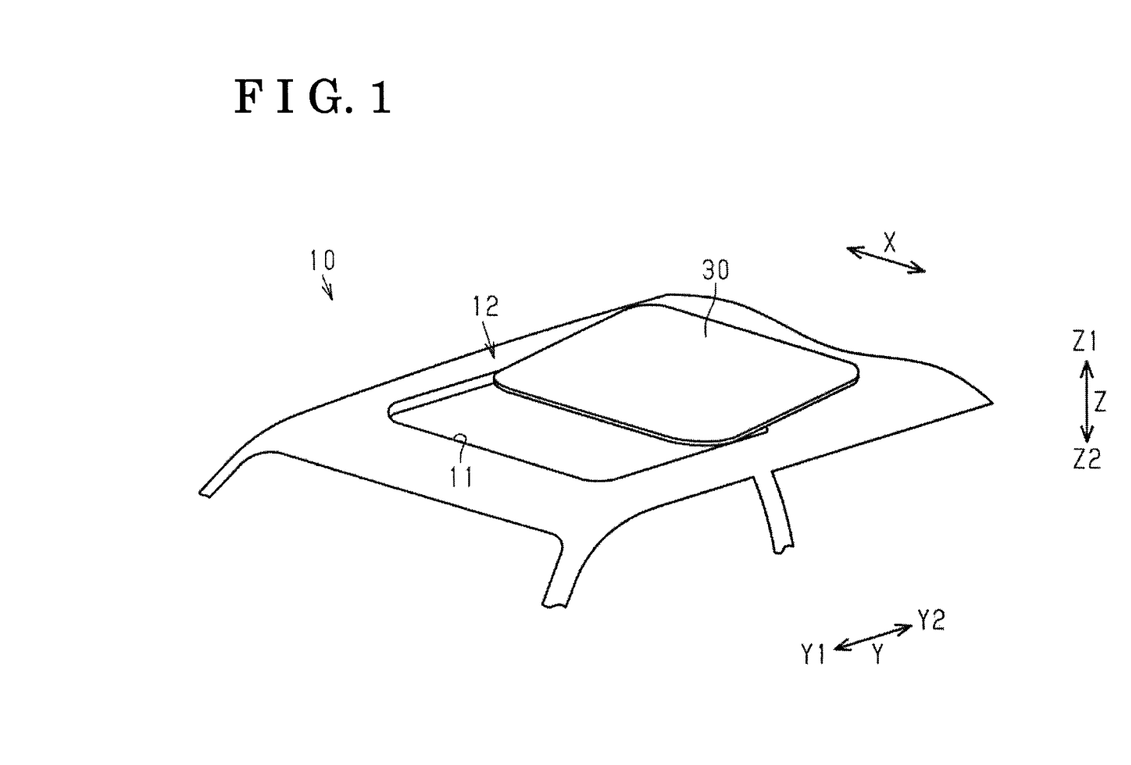
FIG. 1 is a schematic view of a vehicle on which a sunroof apparatus is mounted according to an embodiment disclosed here.

As illustrated in FIG. 1, a vehicle 10 includes a sunroof apparatus 12 opening and closing a roof opening portion 11. The roof opening portion 11 is formed in a substantially quadrilateral shape including a vehicle width direction X as a longitudinal direction, and a vehicle front-rear direction Y as a lateral direction.

Figure 2:
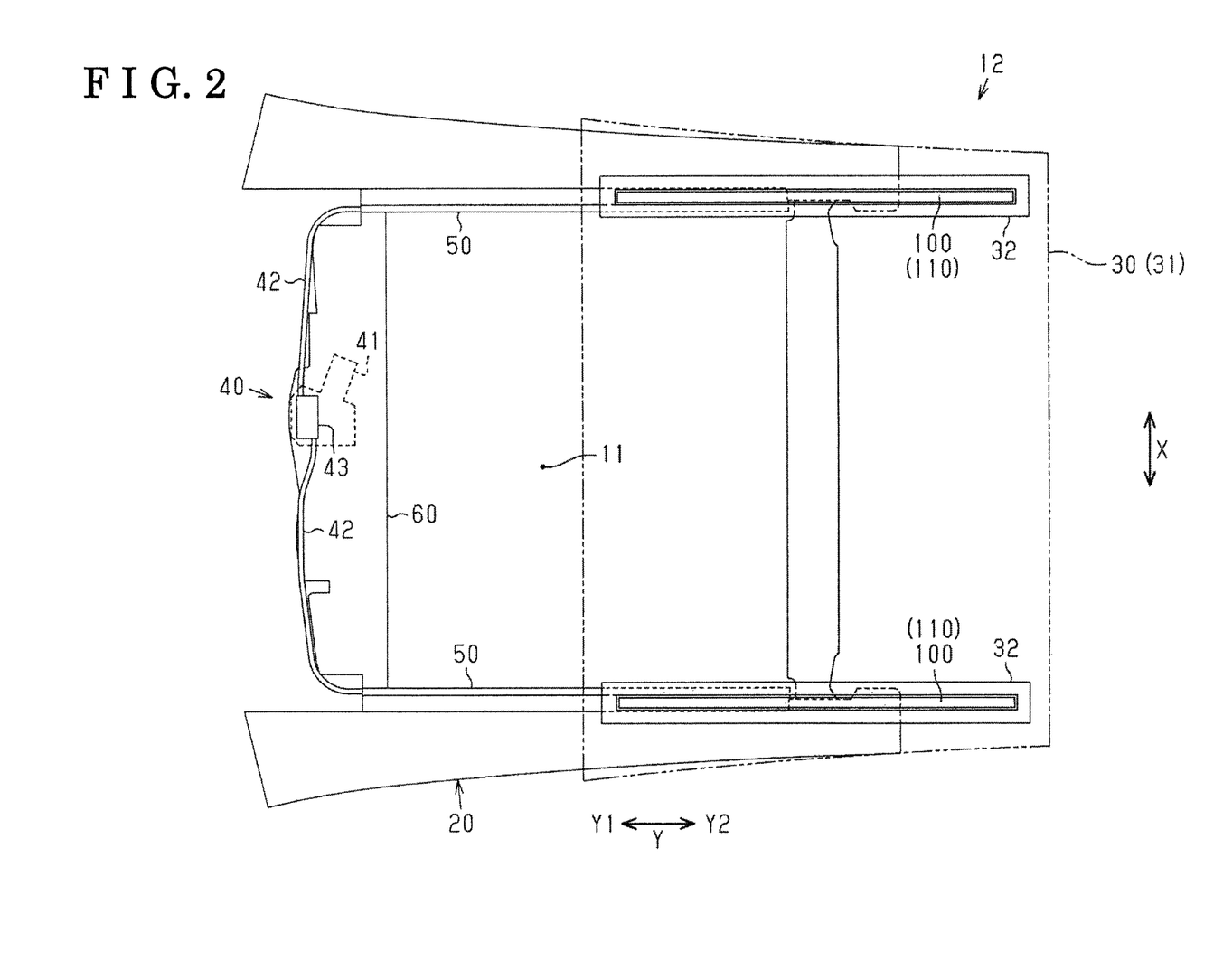
FIG. 2 is a plan view illustrating a summarized configuration of the sunroof apparatus.

As illustrated in FIG. 2, the sunroof apparatus 12 includes a base frame 20, a movable panel 30, and an actuator 40. The base frame 20 has the roof opening portion 11. The movable panel 30 opens and closes the roof opening portion 11. The actuator 40 drives the movable panel 30. The sunroof apparatus 12 includes a pair of guide rails 50, a front frame 60, and a pair of functional components 100. The guide rails 50 extend in the vehicle front-rear direction Y at both end portions of the roof opening portion 11 in the vehicle width direction X. The front frame 60 connects front ends of the pair of guide rails 50. The functional components 100 each connects the movable panel 30 and the guide rail 50.

As illustrated in FIG. 2, the base frame 20 forms an outer frame of a roof of the vehicle 10. The base frame 20 is connected to, for example, a front pillar, a center pillar, and a rear pillar. The movable panel 30 includes a translucent panel 31 and a pair of panel brackets 32. The translucent panel 31 is made of, for example, glass or translucent resin. The panel brackets 32 extend in the vehicle front-rear direction Y at both end portions of the translucent panel 31 in the vehicle width direction X. The translucent panel 31 and the panel brackets 32 may be integrally provided by having attachment layers made of, for example, resin, therebetween.

The actuator 40 includes an electric motor 41, a pair of transmission cables 42, and a transmission mechanism 43. The pair of transmission cables 42 each extends and retracts by power of the electric motor 41. The transmission mechanism 43 converts the rotation movement of an output shaft of the electric motor 41 into the extended and retracted movement of the transmission cable 42. The transmission cable 42 serves as a power transmission member for transmitting power in a push-pull direction to a drive shoe 220 of the functional component 100. The electric motor 41 and the transmission mechanism 43 are arranged at a center portion of the front frame 60 in the vehicle width direction X. Accordingly, as illustrated in FIG. 2, the transmission cable 42 is arranged so as to be extended toward the pair of guide rails 50 from the center portion of the front frame 60 in the vehicle width direction X.

Figure 3A:
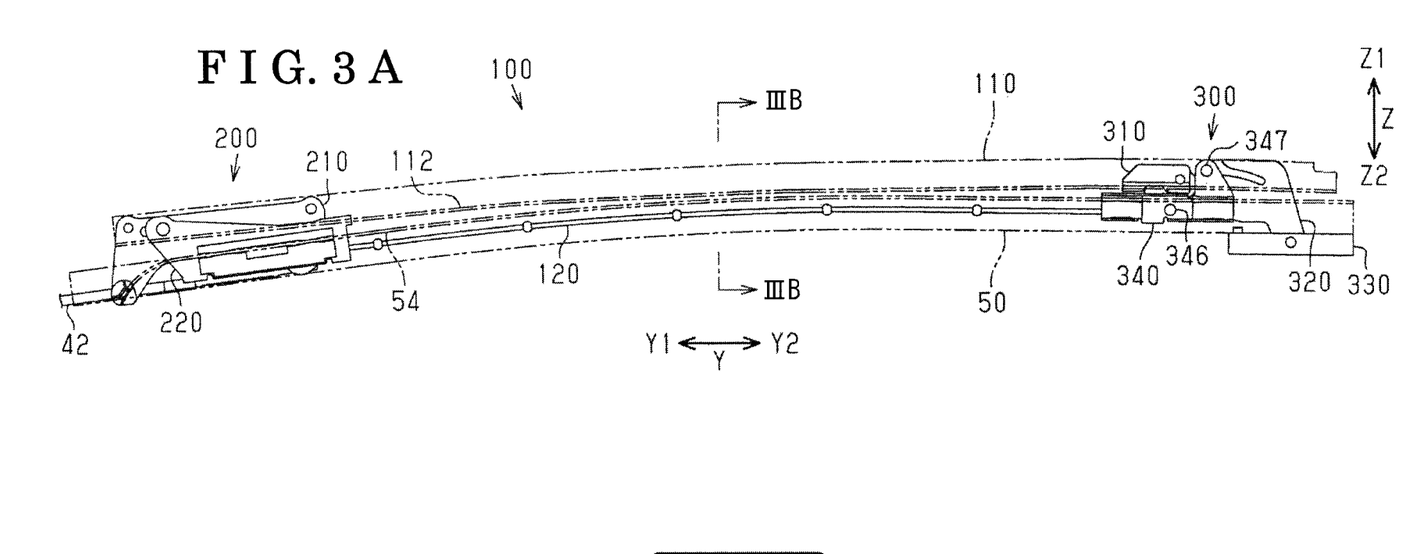
FIG. 3A is a side view illustrating a functional component of the sunroof apparatus.

As illustrated in FIG. 3A, the guide rail 50 is formed so as to be along with the shape of the roof of the vehicle 10. Specifically, the guide rail 50 is slightly curved so as to be inclined in a vehicle lower direction Z2 towards a vehicle front direction Y1. In the embodiment, the extension in the vehicle front-rear direction Y includes a mode in which an object extends in the vehicle front-rear direction Y while being curved.

Figure 3B:
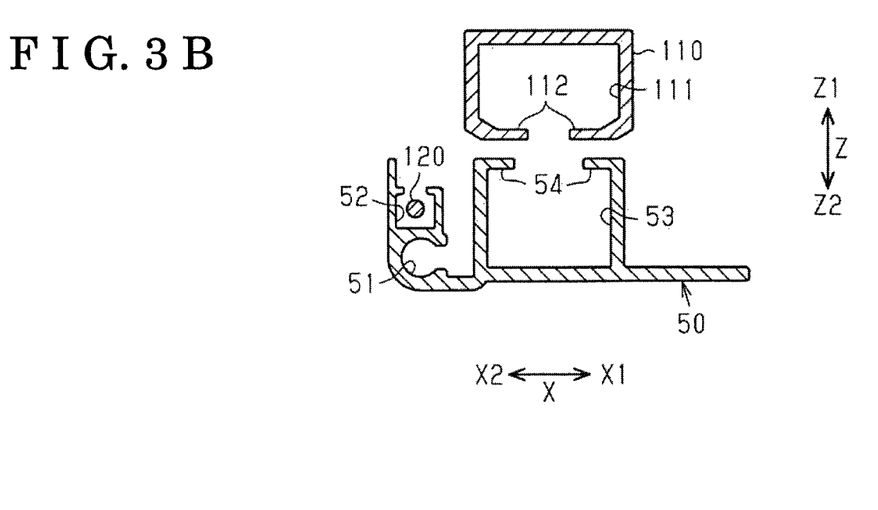
FIG. 3B is a cross sectional view illustrating the functional component of the sunroof apparatus taken along line IIIB-IIIB in a direction of an arrow in FIG. 3A.

As illustrated in FIG. 3B, the guide rail 50 includes a first groove 51, a second groove 52, and a third groove 53. The first groove 51 houses the transmission cable 42 along the longitudinal direction. The second groove 52 houses a link cable 120 along the longitudinal direction. The third groove 53 houses a part of the functional component 100 along the longitudinal direction. Hereinafter, a portion covering the third groove 53 from the vehicle upper direction Z1 and extending in the vehicle width direction X also refers to a guide 54.

Next, the functional component 100 will be explained in detail with reference to FIGS. 3 to 7. As illustrated in FIG. 3A, the functional component 100 includes a slide rail 110, a front support mechanism 200, a rear support mechanism 300, and a link cable 120. The slide rail 110 is connected to the panel bracket 32 of the movable panel 30. The front support mechanism 200 and the rear support mechanism 300 support the slide rail 110. The link cable 120 connects the front support mechanism 200 and the rear support mechanism 300.

As illustrated in FIG. 3A, the slide rail 110 extends in the vehicle front-rear direction Y so as to be along with the guide rail 50. As shown in FIG. 3B, the slide rail 110 includes a fourth groove 111 which houses parts of the front support mechanism 200 and the rear support mechanism 300. Hereinafter, a part of the slide rail 110 covering the fourth groove 111 from the vehicle lower direction Z2 and extending in the vehicle width direction also refers to a guide 112.

Figure 4:
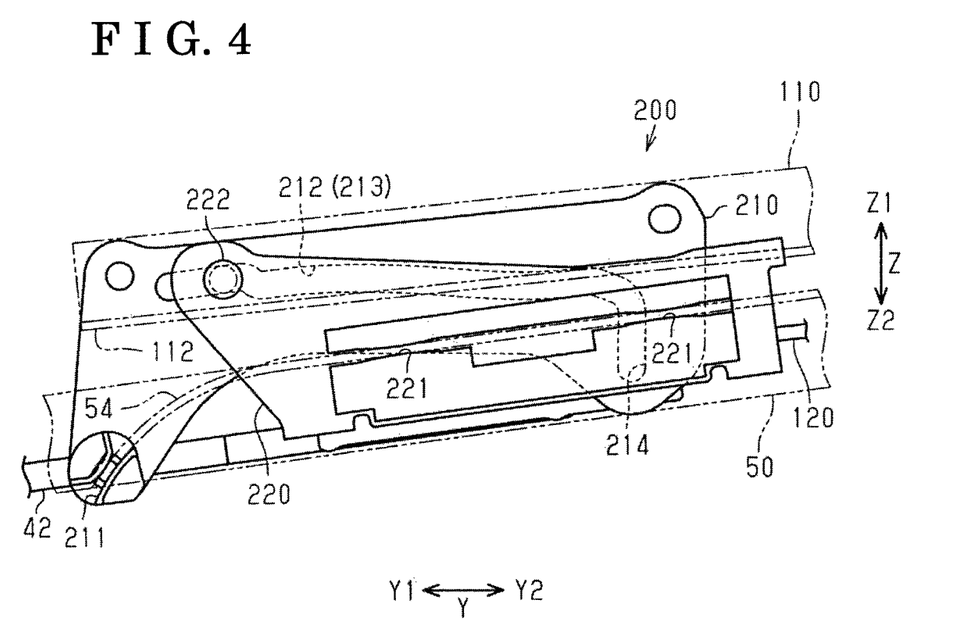
FIG. 4 is a side view when a front support mechanism is seem from outward in a vehicle width direction.
Figure 5:
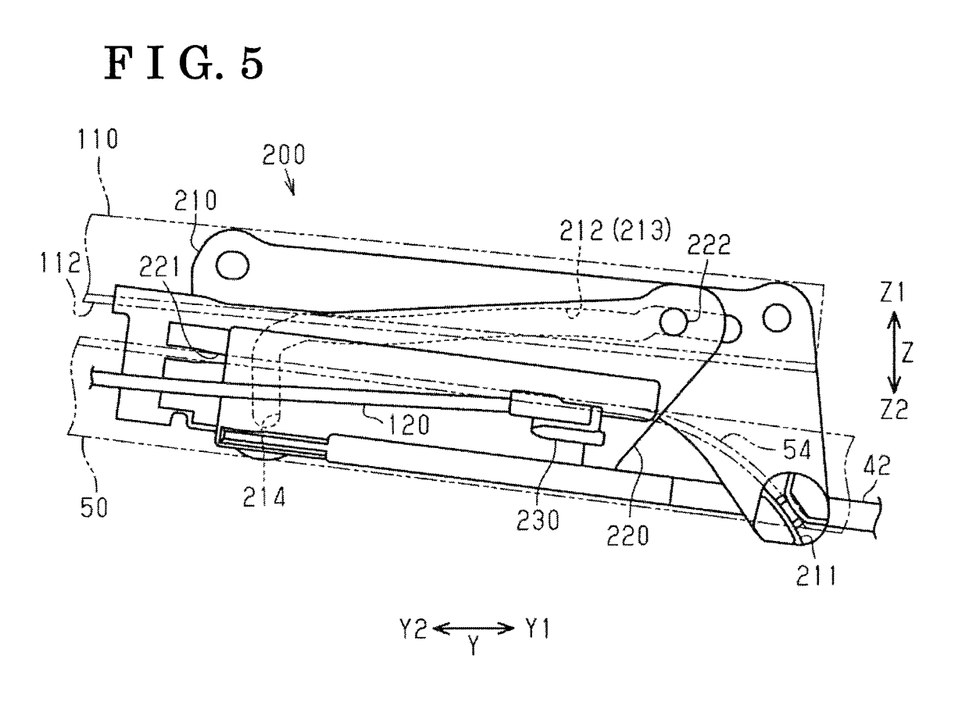
FIG. 5 is a side view when the front support mechanism is seem from inward in the vehicle width direction.

As shown in FIGS. 4 and 5, the front support mechanism 200 includes a front link 210 and the drive shoe 220. The front link 210 supports a distal end portion of the slide rail 110. The drive shoe 220 drives the front link 210. As illustrated in FIG. 5, the front support mechanism 200 includes a check 230 connecting the drive shoe 220 and the link cable 120.

As shown in FIG. 4, the front link 210 includes a front shoe 211 at a front end portion thereof, the front shoe 211 sliding with the guide 54 of the guide rail 50. The front shoe 211 is rotatable about a rotation axis extending in the vehicle width direction X. The front link 210 is provided with a guide hole 212 formed in a substantially L shape when seen from a side in the vehicle width direction X. As illustrated in FIG. 4, the guide hole 212 includes a first part 213 and a second part 214. The first part 213 extends so as to be along with the guide rail 50 in the longitudinal direction. The second part 214 extends in a direction orthogonal to the longitudinal direction of the guide rail 50. In other words, as shown in FIG. 4, the first part 213 corresponds to a part extending in the vehicle front-rear direction Y, and the second part 214 corresponds to a part extending in the vehicle upper-lower direction Z. The front link 210 is connected to the slide rail 100 so as to be relatively unrotatable therewith. That is, the front link 210 integrally moves with the slide rail 110.

As illustrated in FIGS. 4 and 5, the drive shoe 220 includes a front guide shaft 222 extending in the vehicle width direction X. The front guide shaft 222 passes through the guide hole 212 of the front link 210. The drive shoe 220 includes a sliding groove 221 sliding with the guide 54 of the guide rail 50. The drive shoe 220 is connected to the transmission cable 42 of the actuator 40. Accordingly, in a case where the transmission cable 42 is extended and retracted inside the first groove 51 of the guide rail 50, the drive shoe 220 is extended and retracted along with the guide rail 50.

As illustrated in FIG. 5, the link cable 120 is connected to a rear end portion of the check 230. The engagement state of the check 230 relative to the drive shoe 220 changes in response to the position of the drive shoe 220. In a state where the check 230 is engaged with the drive shoe 220, power of the actuator 40 is transmitted to the rear support mechanism 300 because the drive shoe 220 and the rear support mechanism 300 are connected with each other by the link cable 120. On the other hand, in a state where the check 230 does not engage with the drive shoe 220, the power of the actuator 40 does not transmit to the rear support mechanism 300 because the drive shoe 220 and the rear support mechanism 300 are not connected with each other by the link cable 120.

Figure 6:
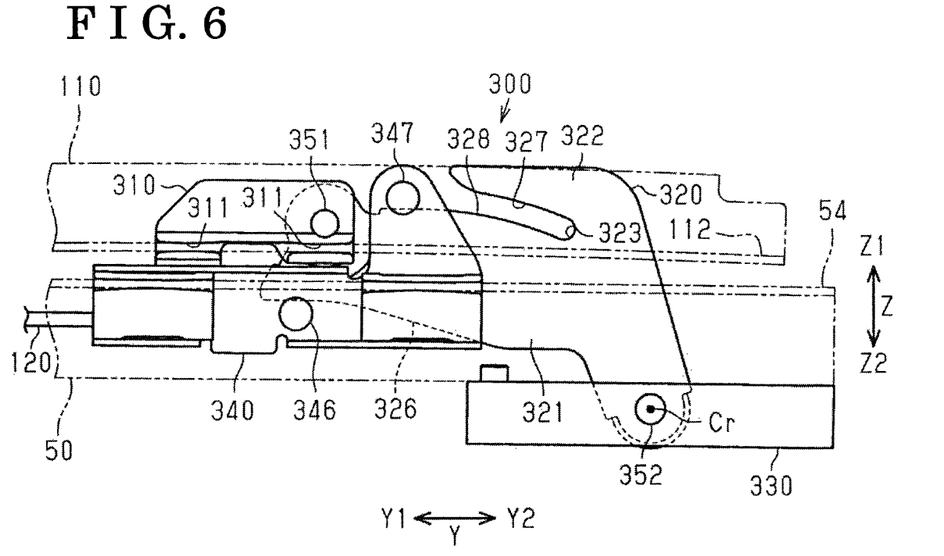
FIG. 6 is a side view when a rear support mechanism is seen from outward in a vehicle width direction.
Figure 7:
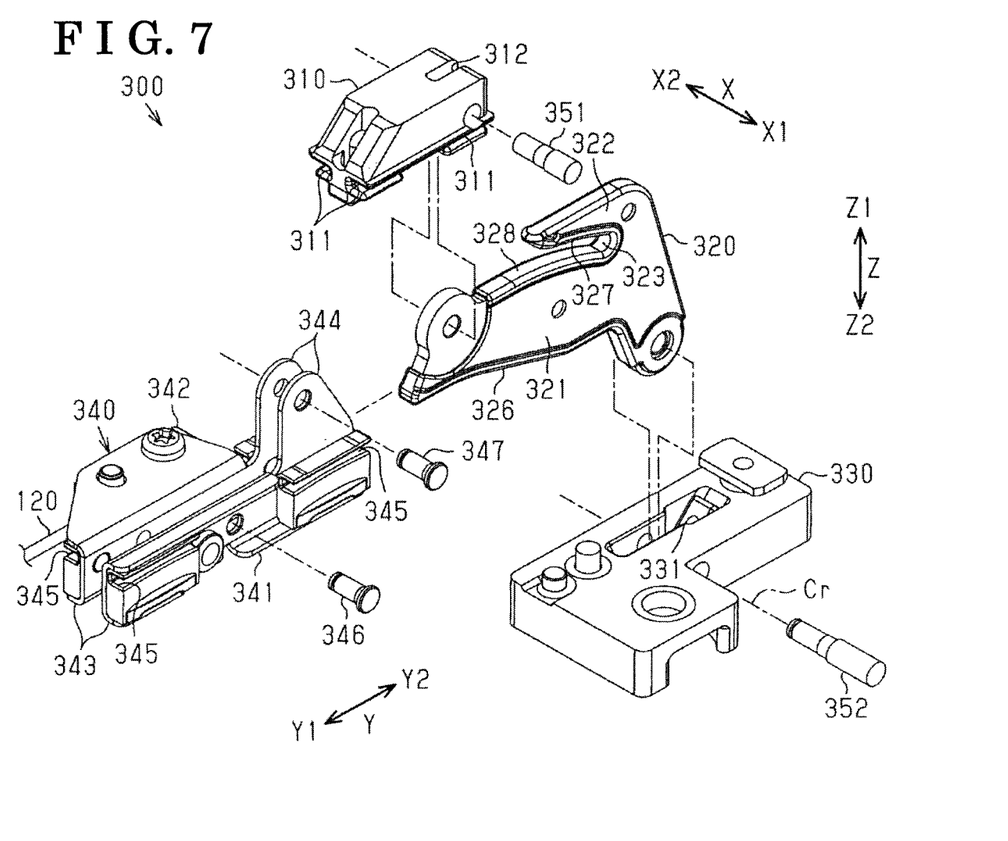
FIG. 7 is an exploded perspective view of the rear support mechanism.

As illustrated in FIGS. 6 and 7, the rear support mechanism 300 includes a slider 310, a rear link 320, a fixing member 330, and a rear shoe 340. The slider 310 supports the slide rail 110. The rear link 320 supports the slider 310. The fixing member 330 supports the rear link 320. The rear shoe 340 drives the rear link 320. The rear support mechanism 300 includes a first connection shaft 351 and a second connection shaft 352. The first connection shaft 351 relatively and rotatably connects the slider 310 and the rear link 320. The second connection shaft 352 relatively and rotatably connects the rear link 320 and the fixing member 330. In the embodiment, the rear link 320 corresponds to an example of a link, and the rear shoe 340 corresponds to an example of a shoe.

The slider 310 is provided with a sliding groove 311 and a housing groove 312. The sliding groove 311 slides with the guide 112 of the slide rail 110. The housing groove 312 houses the rear link 320. The sliding groove 311 corresponds to a recess at each end of the slider 310 in the vehicle width direction X. The housing groove 312 is provided at a rear end of the slider 310 and extends from a center portion in the vehicle width direction X towards the front. As illustrated in FIG. 6, the slider 310 is arranged inside the slide rail 110 in a state where the sliding groove 311 is engaged with the guide 112 of the slide rail 110.

As shown in FIGS. 6 and 7, the rear link 320 is formed in a plate shape and includes a thickness in the vehicle width direction X. The rear link 320 includes a body portion 321 and a protrusion 322. The body portion 321 connects a distal end portion of the rear link 320 through which the first connecting shaft 351 passes and a base end portion through which the second connecting shaft 352 passes. The protrusion 322 is divided from a base end portion of the rear link 320 so as to be along with the body portion 321. That is, the rear link 320 is provided with a guide groove 323 being arranged between the body portion 321 and the protrusion 322 and opening towards the distal end portion of the rear link 320. The rear link 320 includes a first guide surface 326, a second guide surface 327, and a third guide surface 328. The first guide surface 326 is slidable with a first guide shaft 346. The second guide surface 327 and the third guide surface 328 are slidable with a second guide shaft 347.

The first guide surface 326 corresponds to a bottom surface of the body portion 321 in a case where the rear link 320 is arranged at a forward-inclined position or a forward-inclination position shown in FIG. 6. The first guide surface 326 is inclined in the vehicle lower direction Z2 towards the vehicle rear direction Y2 in a case where the rear link 320 is inclined forward. The second guide surface 327 corresponds to a bottom surface of the protrusion 322 in a case where the rear link 320 is inclined forward. The third guide surface 328 corresponds to a top surface of the body portion 321 in a case where the rear link 320 is inclined forward. The second guide surface 327 and the third guide surface 328 are inclined in the vehicle lower direction Z2 towards the vehicle rear direction Y2 in a case where the rear link 320 is inclined forward. The rear link 320 is connected to the slider 310 by the first connecting shaft 351 in a state where the distal end portion of the rear link 320 is housed in the housing groove 312 of the slider 310.

In the embodiment, the movable panel 30 shall be indirectly supported by the rear link 320 in terms of that the slide rail 110 supports the movable panel 30, that the slider 310 supports the slide rail 110, and that the rear link 320 supports the slider 310.

The fixing member 330 is fixed at a rear end lower portion of the guide rail 50. The fixing member 330 includes a housing recessed portion 331 in the vehicle lower direction Z2, the housing recessed portion 331 housing a base end portion of the rear link 320. The fixing member 330 rotatably supports the rear link 320 by supporting both end portions of the second connecting shaft 352 passing through the base end portion of the rear link 320. Hereinafter, an axis of the second connecting shaft 352 also refers to a rotation center Cr of the rear link 320.

The rear shoe 340 includes a first rear shoe 341, a second rear shoe 342, the first guide shaft 346, and the second guide shaft 347. The rear shoe 340 is divided in the vehicle width direction X to be provided with the first rear shoe 341 and the second rear shoe 342. The first guide shaft 346 and the second guide shaft 347 connect the first rear shoe 341 and the second rear shoe 342 in the vehicle width direction X, respectively. The first rear shoe 341 is arranged in the vehicle outer direction X1 of the vehicle width direction X. The second rear shoe 342 is arranged in the vehicle inner direction X2 of the vehicle width direction X. Each of the first rear shoe 341 and the second rear shoe 342 includes a sliding body 343 and a standing board 344. The sliding body 343 slides with the guide rail 50. The standing board 344 extends in the vehicle upper direction Z1 from the sliding body 343. Each of the sliding bodies 343 of the first rear shoe 341 and the second rear shoe 342 includes a sliding groove 345 being recessed and sliding with the guide 54 of the guide rail 50. The first guide shaft 346 and the second guide shaft 347 each is formed in a cylinder shape having the same size. The first guide shaft 346 connects the sliding bodies 343 of the first rear shoe 341 and the second rear shoe 342. The second guide shaft 347 connects the standing boards 344 of the first rear shoe 341 and the second rear shoe 342.

As illustrated in FIG. 6, the rear shoe 340 is arranged at the third groove 53 of the guide rail 50 in a state where the sliding groove 345 is engaged with the guide 54 of the guide rail 50. As such, the rear shoe 340 is movable in the vehicle front-rear direction Y along with the guide rail 50. The first guide shaft 346 is arranged in the vehicle lower direction Z2 relative to the second guide shaft 347 in a state where the rear shoe 340 is housed in the guide rail 50. In particular, the first guide shaft 346 is arranged in the vehicle lower direction Z2 relative to the guide 54 of the guide rail 50, and the second guide shaft 347 is arranged in the vehicle upper direction Z1 relative to the guide 54 of the guide rail 50. Accordingly, as illustrated in FIG. 6, when seeing the rear link 320 from the vehicle width direction X, the first guide shaft 346 is hidden by the guide rail 50, and the second guide shaft 347 is exposed from the guide rail 50.

The second rear shoe 342 is connected with the link cable 120. Thus, the second rear shoe 342 (the rear shoe 340) is extended and retracted within the guide rail 50 in addition to the link cable 120 in a case where the link cable 120 is extended and retracted within the guide rail 50.

As illustrated in FIG. 3A, the link cable 120 serves as a power transmission member transmitting the power in the push-pull direction from the drive shoe 220 to the rear shoe 340. It is favorable that a material and a shape of the link cable 120 is selected so as not to be bent inside the second groove 52 when being applied with a compression load.

Figure 8A:
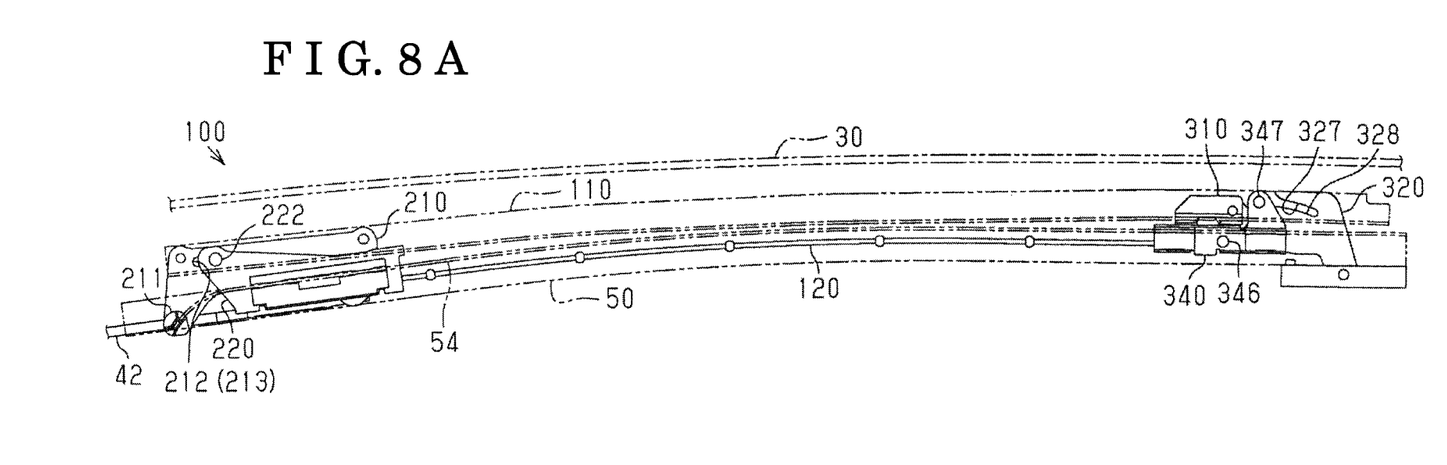
FIG. 8A is a side view illustrating a movement of the sunroof apparatus.

Next, the action of the embodiment will be explained with reference to FIGS. 8 to 10. In the embodiment, the vehicle rear direction Y2 corresponds to a first direction, and the vehicle front direction Y1 corresponds to a second direction. As illustrated in FIG. 8A, the drive shoe 220 is arranged in the foremost position in the vehicle front direction Y1 in a moving range of the drive shoe 220, and the rear shoe 340 is arranged in the foremost position in the vehicle front direction Y1 in a moving range of the rear shoe 340. Accordingly, the front link 210 is arranged at a lowermost position of the front end portion of the guide rail 50 in a moving range of the front link 210, and the rear link 320 is arranged at a foremost inclined position (the first position) in a rotation range where the rear link 320 is inclined forward at the most degree. As a result, the slide rail 110 is lowered over the whole range in the longitudinal direction, and the movable panel 30 is arranged at the fully-closed position where the movable panel 30 closes the roof opening portion 11. In other words, as shown in FIG. 8A, the movable panel 30 is arranged at a tilt-down position where the movable panel 30 is tilted at the most degree in a case where the rear link 320 is arranged at the forward-inclined position.

Figure 8B:
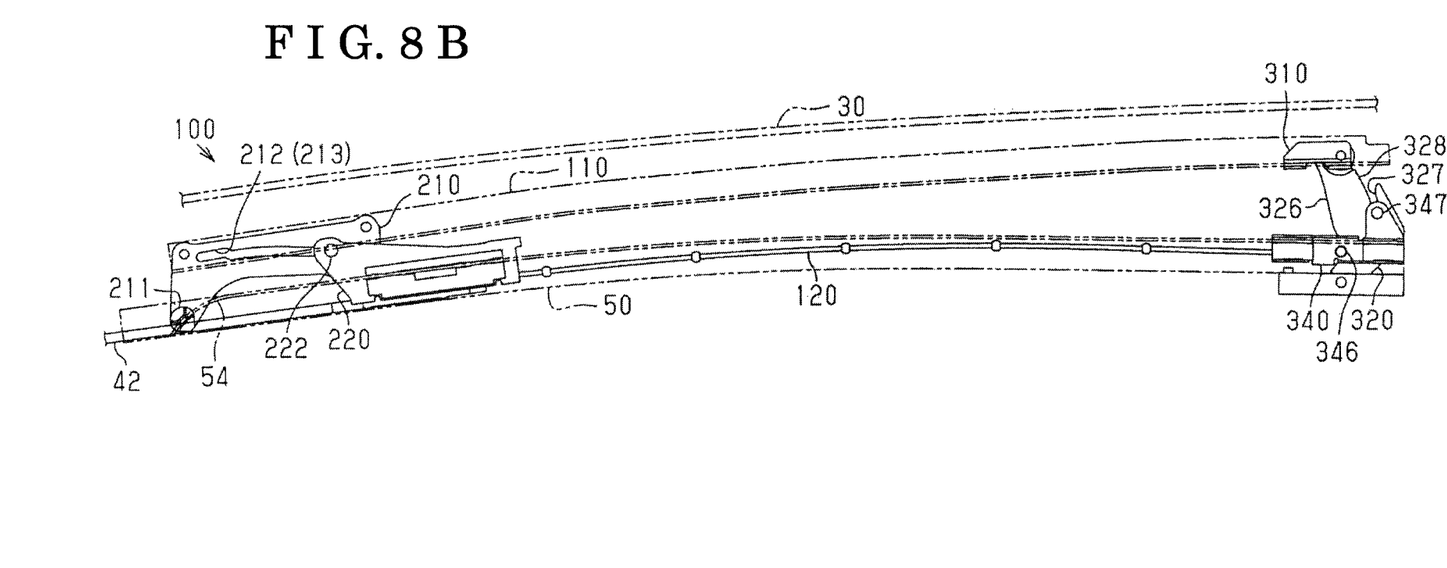
FIG. 8B is another side view illustrating the movement of the sunroof apparatus.

As illustrated in FIG. 8B, the front guide shaft 222 of the drive shoe 220 slides with the guide hole 212 of the front link 210 in a case where the drive shoe 220 moves in the vehicle rear direction Y2 by the operation of the actuator 40. Because the drive shoe 220 does not press the front link 210 in the vehicle rear direction Y2 while the front guide shaft 222 slides with the first portion 213 of the guide hole 212, the position and the posture of the front link 210 is not substantially changed.

Meanwhile, the drive shoe 220 presses the rear shoe 340 in the vehicle rear direction Y2 via the check 230 and the link cable 120. Accordingly, the rear shoe 340 moves in the vehicle rear direction Y2, and the first guide shaft 346 and the second guide shaft 347 of the rear shoe 340 slide with the first guide surface 326 and the second guide surface 327 of the rear link 320, respectively. That is, the rear link 320 is applied with torque rotating the rear link 320 in a standing direction of the rear link 320.

As a result, the rear link 320 rotates to a standing position (a second position) where the rear link 320 is at the most standing position, or the highest position thereof in the rotation range. In a process in which the rear link 320 rotates from the forward inclination position to the standing position, the slider 310 supported at a front end portion of the rear link 320 moves in the vehicle upper direction Z1, and the rear end portion of the slide rail 110 supported by the slider 310 moves in the vehicle upper direction Z1. That is, the movable panel 30 is tilted up. As illustrated in FIG. 8B, in a case where the rear link 320 is arranged at the standing position, the movable panel 30 is arranged at the tilt-up position where the movable panel 30 is tilted up in the most degree. The tilt-up position is a position where the rear end portion of the movable panel 30 is higher relative to the front end portion thereof than the tilt-down position.

As shown in FIG. 8B, the front guide shaft 222 comes in contact with the second part 214 of the guide hole 212 in a case where the drive shoe 220 moves in the vehicle rear direction Y2 after the rear link 320 is arranged at the standing position. Accordingly, the front shoe 211 of the front link 210 slides with a front end part (an inclination part) of the guide 112, and the front guide shaft 222 slides with the second part 214 of the guide hole 212 by the drive shoe 220 that presses the front link 210 in the vehicle rear direction Y2. That is, the front link 210 moves in the vehicle upper direction Z1 along with the front end part of the guide 112. Then, in a case where the sliding of the front shoe 211 of the front link 210 and the front end part of the guide 112 is finished, the movement of the front link 210 in the vehicle upper direction Z1 is finished. Accordingly, after the movement of the front link 210 in the vehicle upper direction Z1 is finished, the front link 210 moves in the vehicle rear direction Y2 along with the guide rail 50 by the movement of the drive shoe 220 in the vehicle rear direction Y2. That is, the movable panel 30 moves in the vehicle rear direction Y2.

Meanwhile, the drive shoe 220 and the check 230 are released from each other in a case where the rear link 320 is arranged at the standing position. Accordingly, after the rear link 320 is arranged at the standing position, the rear shoe 340 does not move in the vehicle rear direction Y2 even the drive shoe 220 moves in the vehicle rear direction Y2. Thus, in a state where the rear link 320 is arranged at the standing position, the slide rail 110 slides with the slider 310 in a case where the slide rail 110 moves in the vehicle rear direction Y2.

Figure 8C:
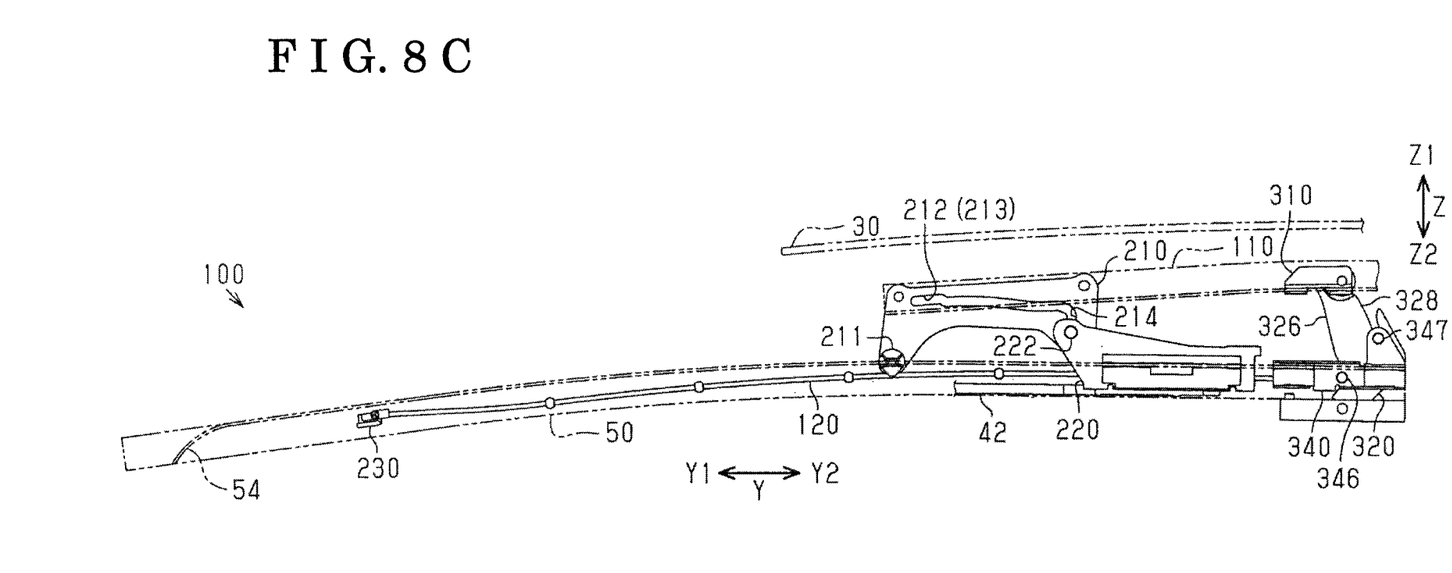
FIG. 8C is still another side view illustrating the movement of the sunroof apparatus.

As illustrated in FIG. 8C, the movable panel 30 is arranged in a fully-open position where the roof opening portion 11 is fully opened in a case where the drive shoe 220 moves to the rearmost position in the vehicle rear direction Y2 in the moving range of the drive shoe 220.

In a case where the drive shoe 220 moves in the vehicle front direction Y1 from a state shown in FIG. 8C, the drive shoe 220 pushes the front link 210 to move the movable panel 30 from the fully-open position to the tilt-up position. Then, in a case where the drive shoe 220 further moves in the vehicle front direction Y1, the drive shoe 220 pulls the rear shoe 340 in the vehicle front direction Y1 by being engaged with the check 230. Accordingly, the second guide shaft 347 of the rear shoe 340 slides with the third guide surface of the rear link 320 by the movement of the rear shoe 340 in the vehicle front direction Y1. That is, the rear link 320 is applied with the torque rotating the rear link 320 in the forward tilting direction. As a result, the rear link 320 rotates to the forward inclination position, and moves the movable panel 30 from the tilt-up position to the tilt-down position (the fully-closed position).

Accordingly, as illustrated in FIGS. 8A and 8B, the movable panel 30 of the embodiment opens and closes the roof opening portion 11 by moving the rear end portion in the vehicle upper-lower direction Z relative to the front end portion by the operation of the actuator 40 (a tilt opening and closing movement). As shown in FIGS. 8B and 8C, the movable panel 30 opens and closes the roof opening portion 11 by moving in the vehicle front-rear direction Y by the operation of the actuator 40 (a slide opening and closing movement).

Next, the action in a case where the rear link 320 rotates will be explained in detail with reference to FIGS. 9A, 9B and 9C. First of all, a case where the rear link 320 rotates to the standing position from the forward-inclination position will be explained.

Figure 9A:
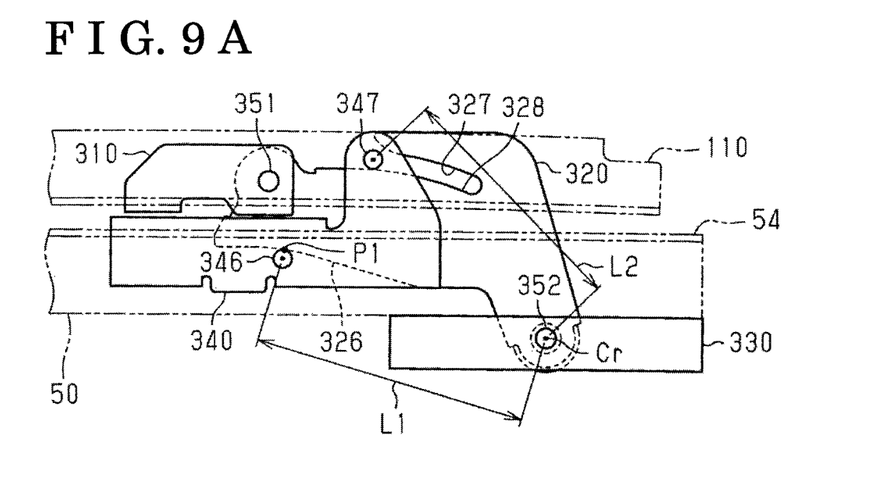
FIG. 9A is a side view illustrating a movement of the rear support mechanism.
Figure 9B:
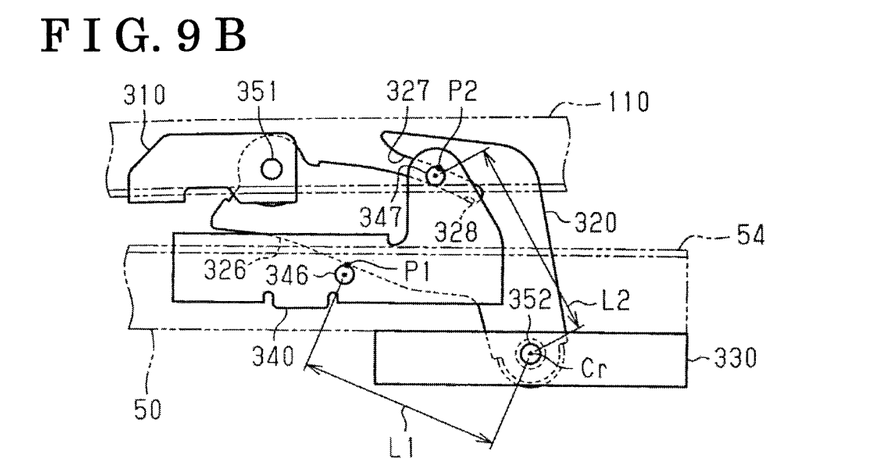
FIG. 9B is another side view illustrating the movement of the rear support mechanism.

In a case where the rear link 320 rotates from the forward-inclination position shown in FIG. 9A to a middle position shown in FIG. 9B, the second guide shaft 347 and the second guide surface 327 do not slide with each other while the first guide shaft 346 and the first guide surface 326 slide with each other. That is, in a case where the rear link 320 rotates from the forward-inclination position to the middle position, the first guide shaft 346 presses the first guide surface 326 to generate the torque rotating the rear link 320. Here, the torque rotating the rear link 320 is in proportion to a distance from the rotation center Cr of the rear link 320 to a first contact point P1 between the first guide shaft 346 and the first guide surface 326.

As illustrated in FIG. 9A, in a case where the rear link 320 is arranged between the forward-inclination position and the middle position, a first distance L1 from the rotation center Cr of the rear link 320 to the axis of the first guide shaft 346 is longer than a second distance L2 from the rotation center Cr of the rear link 320 to the axis of the second guide shaft 347.

In a case where the rear link 320 is arranged at the middle position shown in FIG. 9B, the second guide shaft 347 is in contact with the second guide surface 327 in a state where the first guide shaft 346 is in contact with the first guide surface 326. In a case where the rear link 320 is arranged at the middle position, the first distance L1 from the rotation center Cr of the rear link 320 to the axis of the first guide shaft 346 is equal to the second distance L2 from the rotation center Cr of the rear link 320 to the axis of the second guide shaft 347. That is, in the embodiment, the middle position of the rear link 320 is the position of the rear link 320 in a case where the first distance L1 and the second distance L2 are equal to each other.

Figure 9C:
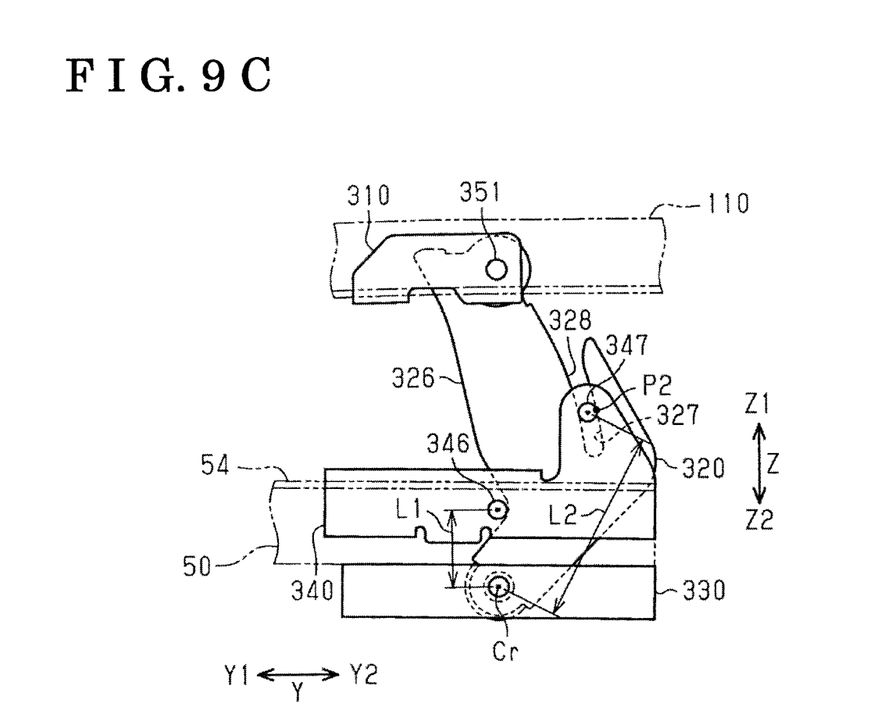
FIG. 9C is still another side view illustrating the movement of the rear support mechanism.

In a case where the rear link 320 rotates from the middle position shown in FIG. 9B to the standing position shown in FIG. 9C, the first guide shaft 346 and the first guide surface 326 do not slide with each other while the second guide shaft 347 and the second guide surface 327 slide with each other. That is, in a case where the rear link 320 rotates from the middle position to the standing position, the torque rotating the rear link 320 is generated by the second guide shaft 347 that presses the second guide surface 327. Here, the torque rotating the rear link 320 is in proportion to a distance from the rotation center Cr of the rear link 320 to a second contact point P2 between the second guide shaft 347 and the second guide surface 327.

As illustrated in FIG. 9C, in a case where the rear link 320 is arranged between the middle position to the standing position, the first distance L1 from the rotation center Cr of the rear link 320 to the axis of the first guide shaft 346 is shorter than the second distance L2 from the rotation center Cr of the rear link 320 to the axis of the second guide shaft 347.

As illustrated in FIG. 9C, in a case where the rear link 320 is arranged at the standing position, the first guide shaft 346 and the second guide shaft 347 retain the body portion 321 of the rear link 320 by sandwiching the body portion 321 in the vehicle front-rear direction Y. Accordingly, even the torque rotating about the rotation center Cr is applied to the rear link 320 by the sliding of the slide rail 110 relative to the slider 310, the rear link 320 may easily be maintained in a standing position.

Next, a case where the rear link 320 rotates from the standing position to the forward-inclination position, that is, a case where the movable panel 30 is tilted down will hereunder be explained. In a case where the rear link 320 rotates from the standing position shown in FIG. 9C to the forward-inclination position shown in FIG. 9A, the first guide shaft 347 and the third guide surface 328 slide with each other. That is, in a case where the rear link 320 rotates from the standing position to the forward-inclination position, the torque rotating the rear link 320 is generated by the second guide shaft 347 that presses the third guide surface 328.

In the embodiment, rotating the rear link 320 from the forward-inclination position to the standing position shall require torque larger than rotating the rear link 320 from the standing position to the forward-inclination position. In other words, a larger torque for rotating the rear link 320 to tilt up the movable panel 30 shall be required than a torque for rotating the rear link 320 to tilt theredown.

In the embodiment, in a case where the rear link 320 rotates between the forward-inclination position to the middle position, the positional relationship between the first guide shaft 346 and the second guide shaft 347, and the shape of the rear link 320 are set such that one of between the first guide shaft 346 and the first guide surface 326 and between the second guide shaft 347 and the third guide surface 328 includes a clearance.

The advantages and effects of the embodiment will hereunder be explained.

In the embodiment, for example, in a case of a comparison example in which the rear link 320 rotates from the forward-inclination position to the standing position only by the pressing of the first guide shaft 346 to the first guide surface 326, the first distance L1 is decreased as the rotation amount of the rear link 320 is increased. Thus, in the comparison example, the torque applying to the rear link 320 is easily decreased as the rotation amount of the rear link 320 is increased.

On the other hand, in the embodiment, in a case where the rear link 320 rotates from the forward-inclination position to the middle position, the torque generated by the first guide shaft 346 that presses the first guide surface 326 rotates the rear link 320. In a case where the rear link 320 rotates from the middle position to the standing position, the torque generated by the second guide shaft 347 that presses the second guide surface 327 rotates the rear link 320. Here, in a case where the rear link 320 is arranged between the middle position and the standing position, the second distance L2 is longer than the first distance L1. Accordingly, the sunroof apparatus 12 may inhibit the torque applied to the rear link 320 from being decreased as the rotation amount of the rear link 320 is increased. Thus, the sunroof apparatus 12 performs the tilting operation of the movable panel 30 securely regardless of the rotation amount of the rear link 320.

In a case where the rear link 320 rotates from the standing position to the forward-inclination position, the second guide shaft 347 and the third guide surface 328 slide with each other and the first guide shaft 346 and the first guide surface 326 do not slide with each other. Accordingly, as in a case in the embodiment, in a case where the torque required for rotating the rear link 320 from the forward-inclination position to the standing position is greater than the torque required to rotate the rear link 320 from the standing position to the forward-inclination position, effects described below will be obtained.

That is, in a state where the rear link 320 rotates from the forward-inclination position to the standing position, in other words, in a case where the torque required for the rotation of the rear link 320 is relatively large, the sunroof apparatus 12 switches from a state where the first guide shaft 346 slides with the first guide surface 326 to a state where the second guide shaft 347 slides with the second guide surface 327. Accordingly, the sunroof apparatus 12 may inhibit the torque applied to the rear link 320 from being decreased. In a case where the rear link 320 rotates from the standing position to the forward-inclination position, in other words, in a case where the torque required for the rotation of the rear link 320 is relatively small, the sunroof apparatus 12 maintains a state where the second guide shaft 347 slides only with the third guide surface 328. Accordingly, the sunroof apparatus 12 does not have to be provided with a fourth guide surface at the rear link 320, the fourth guide surface sliding with the first guide shaft 346 in addition to the third guide surface 328 in a case where the rear shoe 340 moves in the vehicle front direction Y1. In this point, the sunroof apparatus 12 may simplify the structure of the rear link 320.

In a case where the rear link 320 rotates from the forward-inclination position to the middle position by the sliding of the first guide shaft 346 with the first guide surface 326, the rear link 320 may not smoothly rotate because the second guide shaft 347 is in contact with the third guide surface 328. In a case where the rear link 320 rotates from the middle position (the standing position) to the forward-inclination position by the sliding of the second guide shaft 347 with the third guide surface 328, the rear link 320 may not smoothly rotate because the first guide shaft 346 is in contact with the first guide surface 326.

At this point, the sunroof apparatus 12 includes the clearance at one of between the first guide shaft 346 and the second guide surface 326 and between the second guide shaft 347 and the third guide surface 328 in a case where the rear link 320 rotates between the forward-inclination position to the middle position. Accordingly, the sunroof apparatus 12 may inhibit the second guide shaft 347 from coming in contact with the third guide surface 328 in a case where the rear link 320 rotates from the forward-inclination position to the middle position, and the sunroof apparatus 12 may inhibit the first guide shaft 346 from coming in contact with the first guide surface 326 in a case where the rear link 320 rotates from the middle position to the forward-inclination position. As such, the sunroof apparatus 12 may smoothly rotate the rear link 320 in a case where the rear link 320 rotates between the forward-inclination position and the middle position.

In a case of being arranged at the standing position, the rear link 320 is sandwiched by the first guide shaft 346 and the second guide shaft 347. Thus, in a case where the movable panel 30 is applied with a burden by the running of the vehicle 10 or by opening and closing of the movable panel 30, the sunroof apparatus 12 may inhibit the rear link 320 arranged at the standing position from changing the posture thereof.

The embodiment may be modified as follows. The embodiment and a following modified example may be combined to the extent not technically inconsistent.

Figure 10A:
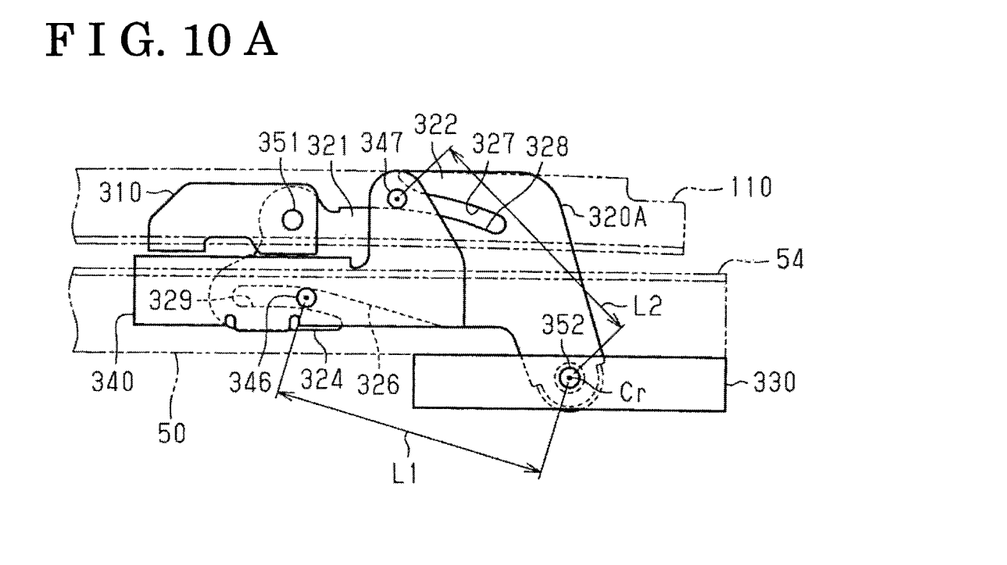
FIG. 10A is a side view illustrating a movement of a rear support mechanism according to a modified example.

As illustrated in FIG. 10A, the rear link 320 may correspond to a rear link 320A including the body portion 321, a first protrusion 322 corresponding to the protrusion 322 in the aforementioned embodiment, and a second protrusion 324 separating from a distal end portion of the rear link 320A so as to be along with the body portion 321. That is, the rear link 320A may include a fourth guide surface 329 sliding with the first guide shaft 346. The fourth guide surface 329 serves as an upper end surface of the second protrusion 324 in a case where the rear link 320A is arranged at the forward-inclination position.

Figure 10B:
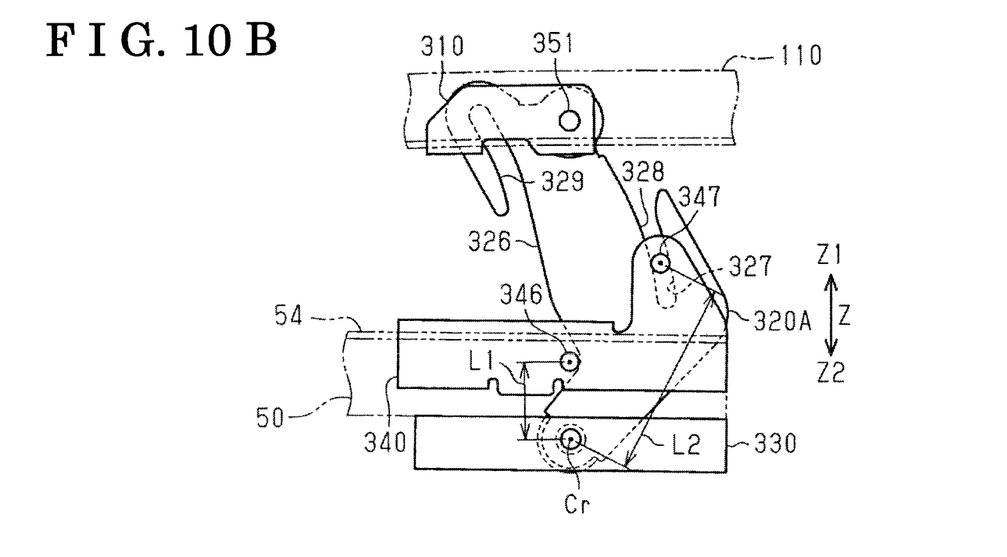
FIG. 10B is another side view illustrating the movement of the rear support mechanism according to the modified example.

As illustrated in FIGS. 10A and 10B, in a case where the rear shoe 340 moves in the vehicle rear direction Y2 in a state where the rear link 320A is arranged at the forward-inclination position, the first guide shaft 346 slides with the first guide surface 326, and the second guide shaft 347 slides with the second guide surface 327. In particular, the rear link 320A rotates from the forward-inclination position to the middle position by the first guide shaft 346 that slides with the second guide surface 327, and the rear link 320A rotates from the middle position to the standing position by the second guide shaft 347 that slides with the second guide surface 327.

As illustrated in FIGS. 10A and 10B, in a case where the rear shoe 340 moves in the vehicle front direction Y1 in a state where the rear link 320A is arranged at the standing position, the second guide shaft 347 slides with the third guide surface 328, and the first guide shaft 346 slides with the fourth guide surface 329. In particular, the second guide shaft 347 slides with the third guide surface 328 to rotate the rear link 320A from the standing position to the middle position, and the first guide shaft 346 slides with the fourth guide surface 329 to rotate the rear link 320A from the middle position to the forward-inclination position.

As shown in FIG. 10A, in a case where the rear link 320A is arranged between the forward-inclination position and the middle position, the first distance L1 is longer than the second distance L2. As shown in FIG. 10B, in a case where the rear link 320A is arranged between the middle position and the standing position, the second distance L2 is longer than the first distance L1.

According to the sunroof apparatus of the modified example, in both cases where the rear link 320A rotates from the forward-inclination position to the standing position, and rotates from the standing position to the forward-inclination position, the combination of a guide shaft and a guide surface which may apply large torque to the rear link 320A may be selected. Thus, according to the sunroof apparatus of the modified example, the distance from the rotation center Cr of the rear link 320A to the contact point between the guide shaft and the guide surface may easily maintain long in a case where the rear link 320A rotates. That is, the sunroof apparatus of the modified example may inhibit the torque applied to the rear link 320A from being decreased in a case where the rear link 320A rotates in the both direction.

The arrangement of the first guide shaft 346 and the second guide shaft 347 of the rear shoe 340, and the arrangement of the first guide surface 326, the second guide surface 327, and the third guide surface 328 of the rear link 320 may be appropriately changed. Examples will hereunder be explained.

The sunroof apparatus 12 may include a first guide surface sliding with the first guide shaft 346 and a second guide surface sliding with the second guide shaft 347 for rotating the rear link 320 from the standing position to the forward-inclination position. The sunroof apparatus 12 may include a third guide surface sliding with the second guide shaft 347 for rotating the rear link 320 from the forward-inclination position to the standing position. In other words, the standing position of the sunroof apparatus 12 corresponds to a first position, and the forward-inclination position corresponds to a second position.

According to a modified example shown in FIG. 10, the rear link 320A does not have to include the first protrusion 322. In this case, according to the sunroof apparatus of the modified example, it is favorable that the first guide shaft 346 slides with the fourth guide surface 329 to rotate rear link 320A from the standing position to the forward-inclination position.

The sunroof apparatus 12 may be configured such that the rear link 320 rotates from the standing position to the forward-inclination position by moving of the rear shoe 340 in the vehicle rear direction Y2, and that the rear link 320 rotates from the forward-inclination position to the standing position by moving of the rear shoe 340 in the vehicle front direction Y1. In other words, according to the sunroof apparatus 12, the vehicle front direction Y1 may correspond to the first direction, and the vehicle rear direction Y2 may correspond to the second direction.

The rear link 320 may rotate between a rearward-inclination position (an example of the tilting direction) and the standing position, the rear-ward-inclination position in which the rear link 320 is inclined rearward so that the distal end portion of the rear link 320 is positioned in the vehicle rear direction Y2 relative to the base end portion thereof. The middle position of the rear link 320 may correspond to a middle range including a predetermined rotation range.

The rear shoe 340 may include a third guide shaft in addition to the first guide shaft 346 and the second guide shaft 347. In this case, it is favorable that the rear link 320 includes a guide surface that is slidable with the third guide shaft. The rear shoe 340 may include plural guide shafts.

The movable panel 30 may include a front end portion which serves as an end portion in the vehicle rear direction Y2, and a rear end portion which serves as an end portion in the vehicle front direction Y1.

According to the aforementioned embodiment, the sunroof apparatus (12) includes the movable panel (30) opening and closing the roof opening portion (11) by moving between the tilt-down position and the tilt-up position where the rear end portion of the movable panel (30) rises relative to the front end portion thereof higher than the tilt-down position, the guide rail (50) arranged at each end portion of the roof opening portion (11) in the vehicle width direction (X, X1, X2), the guide rail (50) extending in the vehicle front-rear direction (Y, Y1, Y2), the shoe (340) including the first guide shaft (346) and the second guide shaft (347) extending in the vehicle width direction (X, X1, X2), the shoe (340) moving along with the guide rail (50), and the link (320, 320A) including a first guide surface (326) and a second guide surface (327), the first guide surface (326) configured to slide with the first guide shaft (346) in a case where the shoe (340) moves in the first direction (Y2), the second guide surface (327) configured to slide with the second guide shaft (347), the link (320, 320A) rotating between the standing position and the inclination position in a state of supporting the movable panel (30), the standing position where the movable panel (30) is arranged at the tilt-up position, the inclination position where the movable panel (30) is arranged at the tilt-down position. In a case where the first position is one of the inclination position and the standing position, the second position is the other of the inclination position and the standing position, the middle position is between the first position and the second position, the first distance (L1) is from the rotation center (Cr) of the link (320, 320A) to the first guide shaft (346), and the second distance (L2) is from the rotation center (Cr) of the link (320, 320A) to the second guide shaft (347), the link (320, 320A) rotates from the first position to the middle position by sliding of the first guide shaft (346) with the first guide surface (326), and rotates from the middle position to the second position by sliding of the second guide shaft (347) with the second guide surface (327). In a case where the link (320, 320A) is arranged between the first position and the middle position, the first distance (L1) is longer than the second distance (L2). In a case where the link (320, 320A) is arranged between the second position and the middle position, the second distance (L2) is longer than the first distance (L1).

According to the aforementioned configuration, the link (the rear link 320, 320A) rotates from the first position to the middle position by the torque generated by the pressing of the first guide shaft (346) to the first guide surface (326). The link (the rear link 320, 320A) rotates from the middle position to the second position by the torque generated by the pressing of the second guide shaft (347) to the second guide surface (327). Here, in a case where the link (the rear link 320, 320A) is arranged between the middle position and the second position, the second distance (L2) is longer than the first distance (L1). Accordingly, for example, comparing to a case where a link rotates from the first position to the second position by the pressing of a first guide shaft to a first guide surface, the torque applied to the link (the rear link 320, 320A) is inhibited from being decreased. Accordingly, according to the sunroof apparatus (12), the movable panel (30) may be securely inclined or tilted regardless of the rotation amount of the link (the rear link 320, 320A).

According to the aforementioned embodiment, the link (320, 320A) includes the third guide surface (328) sliding with one of the first guide shaft (346) and the second guide shaft (347) in a case where the shoe (340) moves in a second direction (Y1) that is opposite to the first direction (Y2).

According to the aforementioned configuration, in a case where the link (the rear link 320, 320A) rotates from the second position to the first position, one of the first guide shaft (346) and the second guide shaft (347) slides with the third guide surface (328), and the other of the first guide shaft (346) and the second guide shaft (347) does not slide with the corresponding guide surface. Accordingly, in a case where the torque required for rotating the link (the rear link 320, 320A) from the first position to the second position is larger than the torque required for rotating the link (the rear link 320, 320A) from the second position to the first position, the following effects may be obtained.

That is, in a case where the link (the rear link 320, 320A) rotates from the first position to the second position, in other words, in a case where the torque required for rotating the link (the rear link 320, 320A) is relatively large, the sunroof apparatus (12) switches from a state where the first guide shaft (346) slides with the first guide surface (326) to a state where the second guide shaft (347) slide with the second guide surface (327). Accordingly, the sunroof apparatus (12) may inhibit the torque applied to the link (the rear link 320, 320A) from being decreased. In a case where the link (the rear link 320, 320A) rotates from the second position to the first position, in other words, in a case where the torque required for rotating the link (the rear link 320, 320A) is relatively small, the sunroof apparatus (12) maintains a state where one of the first guide shaft (346) and the second guide shaft (347) slides with the third guide surface (328). Accordingly, the sunroof apparatus (12) is configured such that the link (the rear link 320, 320A) does not have to be additionally provided with the fourth guide surface (329) sliding with the other of the first guide shaft (346) and the second guide shaft (347) in addition to the third guide surface sliding with the one of the first guide shaft (346) and the second guide shaft (347) in a case where the shoe (the rear shoe 340) moves in the second direction.

According to the aforementioned embodiment, in a case where the one of the first guide shaft (346) and the second guide shaft (347) is the second guide shaft (347), the clearance is formed at one of between the first guide shaft (346) and the first guide surface (326) and between the second guide shaft (347) and the third guide surface (328) in a case where the link (320, 320A) rotates between the first position and the middle position.

In a case where the link (the rear link 320, 320A) rotates from the first position to the middle position by the sliding of the first guide shaft (346) with the first guide surface (326), the link (the rear link 320, 320A) may not smoothly rotate because the second guide shaft (347) is in contact with the third guide surface (328). Similarly, in a case where the link (the rear link 320, 320A) rotates from the middle position to the first position by the sliding of the second guide shaft (347) with the third guide surface (328), the link (the rear link 320, 320A) may not smoothly rotate because the first guide shaft (346) is in contact with the first guide surface (326). At this point, according to the sunroof apparatus (12) of the aforementioned configuration, in a case where the first guide shaft (346) slides with the first guide surface (326), the second guide shaft (347) may be inhibited from coming in contact with the third guide surface (327), and in a case where the second guide shaft (347) slides with the third guide surface (327), the first guide shaft (346) is inhibited from coming in contact with the first guide surface (326). That is, the sunroof apparatus (12) may inhibit the link from not being rotated smoothly.

According to the aforementioned embodiment, the link (320A) includes the third guide surface (328) sliding with the second guide shaft (347) and the fourth guide surface (329) sliding with the first guide shaft (346) in a case where the shoes (340) move in a second direction (Y1) that is opposite to the first direction (Y2). The second guide shaft (347) slides with the third guide surface (328) to rotate the link (320A) from the second position to the middle position. The first guide shaft (346) slides with the fourth guide surface (329) to rotate the link (320A) from the middle position to the first position.

According to the aforementioned configuration, in both cases where the link (the rear link 320, 320A) rotates from the first position to the second position and case where the link (the rear link 320, 320A) rotates from the second position to the first position, the sunroof apparatus (12) may switch a combination of the guide shaft and the guide surface which slide with each other. Accordingly, the sunroof apparatus (12) may easily maintain the distance from the rotation center (Cr) of the link (the rear link 320, 320A) to the contact point between the guide shaft and the guide surface serving as a parameter that is in proportion to the torque applied to the link (the rear link 320, 320A) in a case where the link (the rear link 320, 320A) rotates. Thus, the sunroof apparatus (12) inhibits the torque applied to the link (the rear link 320, 320A) from being decreased in a case where the link (the rear link 320, 320A) rotates in the both direction.

According to the aforementioned embodiment, the link (320, 320A) is sandwiched by the first guide shaft (346) and the second guide shaft (347) in a case where the link (320, 320A) is arranged at the standing position.

According to the aforementioned configuration, the sunroof apparatus (12) may easily maintain the link (the rear link 320, 320A) at the standing position. Accordingly, in a case where the movable panel (30) is applied with the burden by, for example, the running of the vehicle (10), the sunroof apparatus (12) may inhibit the link (the rear link 320, 320A) arranged at the standing position from being changing the posture thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus, comprising:
   a movable panel opening and closing a roof opening portion by moving between a tilt-down position and a tilt-up position where a rear end portion of the movable panel rises relative to a front end portion thereof higher than the tilt-down position;
   a guide rail arranged at each end portion of the roof opening portion in a vehicle width direction, the guide rail extending in a vehicle front-rear direction;
   a shoe including a first guide shaft and a second guide shaft extending in the vehicle width direction, the shoe moving along with the guide rail; and
   a link including a first guide surface and a second guide surface, the first guide surface configured to slide with the first guide shaft in a case where the shoe moves in a first direction, the second guide surface configured to slide with the second guide shaft, the link rotating between a standing position and an inclination position in a state of supporting the movable panel, the standing position where the movable panel is arranged at the tilt-up position, the inclination position where the movable panel is arranged at the tilt-down position; wherein
   in a case where
      a first position is one of the inclination position and the standing position;
      a second position is the other of the inclination position and the standing position;
      a middle position is between the first position and the second position;
      a first distance is from a rotation center of the link to the first guide shaft; and
      a second distance is from the rotation center of the ink to the second guide shaft,
   the link rotates from the first position to the middle position by sliding of the first guide shaft with the first guide surface, and rotates from the middle position to the second position by sliding of the second guide shaft with the second guide surface;
   in a case where the link is arranged between the first position and the middle position, the first distance is longer than the second distance; and
   in a case where the link is arranged between the second position and the middle position, the second distance is longer than the first distance.

2. The sunroof apparatus according to claim 1, wherein the link includes a third guide surface sliding with one of the first guide shaft and the second guide shaft in a case where the shoe moves in a second direction that is opposite to the first direction.

3. The sunroof apparatus according to claim 2, wherein in a case where the one of the first guide shaft and the second guide shaft is the second guide shaft, a clearance is formed at one of between the first guide shaft and the first guide surface and between the second guide shaft and the third guide surface in a case where the link rotates between the first position and the middle position.

4. The sunroof apparatus according to claim 3, wherein the link is sandwiched by the first guide shaft and the second guide shaft in a case where the link is arranged at the standing position.

5. The sunroof apparatus according to claim 2, wherein the link is sandwiched by the first guide shaft and the second guide shaft in a case where the link is arranged at the standing position.

6. The sunroof apparatus according to claim 1, wherein
the link includes a third guide surface sliding with the second guide shaft and a fourth guide surface sliding with the first guide shaft in a case where the shoes move in a second direction that is opposite to the first direction;
the second guide shaft slides with the third guide surface to rotate the link from the second position to the middle position; and
the first guide shaft slides with the fourth guide surface to rotate the link from the middle position to the first position.

7. The sunroof apparatus according to claim 6, wherein the link is sandwiched by the first guide shaft and the second guide shaft in a case where the link is arranged at the standing position.

8. The sunroof apparatus according to claim 1, wherein the link is sandwiched by the first guide shaft and the second guide shaft in a case where the link is arranged at the standing position.

* * * * *